United States Patent [19]
Iino et al.

[11] Patent Number: 6,031,028
[45] Date of Patent: Feb. 29, 2000

[54] CATIONIC ELECTRODEPOSITION COATING COMPOSITION

[75] Inventors: Yutaka Iino; Katsuhisa Sugisaki, both of Hiratsuka; Koji Kamikado, Yokohama, all of Japan

[73] Assignee: Kansai Paint Company, Limited, Amagasaki, Japan

[21] Appl. No.: 09/029,607

[22] PCT Filed: Jul. 9, 1997

[86] PCT No.: PCT/JP97/02379

§ 371 Date: Mar. 10, 1998

§ 102(e) Date: Mar. 10, 1998

[87] PCT Pub. No.: WO98/02494

PCT Pub. Date: Jan. 22, 1998

[30] Foreign Application Priority Data

Jul. 12, 1996 [JP] Japan ..................................... 8-183130

[51] Int. Cl.[7] ............................ C08L 63/02; C08L 63/10; C09D 163/02; C09D 163/10; C09D 175/00
[52] U.S. Cl. ..................... 523/412; 523/409; 523/415; 523/417; 524/507; 524/522; 524/523; 524/539; 524/560; 524/562; 524/591; 524/819; 524/832; 524/839; 524/840; 525/109; 525/111; 525/123; 525/124; 525/131; 525/528
[58] Field of Search ..................................... 524/507, 560, 524/562, 591, 819, 832, 839, 840, 522, 523, 539; 525/109, 111–123, 124, 131, 528; 523/409, 412, 415, 417

[56] References Cited

U.S. PATENT DOCUMENTS

| 4,616,066 | 10/1986 | Tominaga | 525/109 |
|---|---|---|---|
| 5,164,430 | 11/1992 | Hattori et al. | 523/429 |
| 5,283,290 | 2/1994 | Jung et al. | 525/111 |
| 5,331,050 | 7/1994 | Harper | 525/125 |
| 5,472,999 | 12/1995 | Kudoh | 523/409 |

*Primary Examiner*—Rabon Sergent
*Attorney, Agent, or Firm*—Armstrong, Westerman, Hattori, McLeland and Naughton

[57] ABSTRACT

This invention provides a cationic electrodeposition coating composition comprising (A) a resin prepared by reacting an epoxy- or carboxyl-containing acrylic polymer, a bisphenol compound and a bisphenol diglycidyl ether-type epoxy resin to produce an epoxy-containing resin and introducing thereinto cationic groups and (B) a hydroxyl- and amino-containing acrylic resin, the resins (A) and (B) being crosslinked and cured by urethanation reaction with (C) an isocyanate crosslinking agent component. The cationic electrodeposition coating composition of the invention is excellent in curability and in corrosion resistance of the cured coating film.

10 Claims, No Drawings

CATIONIC ELECTRODEPOSITION COATING COMPOSITION

TECHNICAL FIELD

This invention relates to a novel cationic electrodeposition coating composition.

BACKGROUND ART

Japanese Examined Patent Publication No. 71090/1992 discloses a cationic electrodeposition coating composition prepared by reacting an epoxy-containing acrylic polymer, a bisphenol compound and a bisphenol diglycidyl ether-type epoxy resin to produce an epoxy-containing resin, introducing thereinto cationic groups and adding a blocked polyisocyanate compound.

The above electrodeposition coating composition, however, is insufficient in curability and in corrosion resistance of the cured coating film. To improve these properties, a lead compound such as lead acetate, lead 2-ethyl hexanoate or lead silicate is generally added.

The lead compound, however, is toxic and causes environmental pollution. Therefore, a need exists for a lead compound-free cationic electrodeposition coating composition which is excellent in curability and in corrosion resistance of the cured coating film.

DISCLOSURE OF INVENTION

An object of the present invention is to provide a cationic electrodeposition coating composition which is lead compound-free and is excellent in curability and in corrosion resistance of the cured coating film.

Further objects and characteristics of the present invention will be apparent from the following description.

The present invention provides a cationic electrodeposition coating composition comprising (A) a resin prepared by reacting an epoxy- or carboxyl-containing acrylic polymer, a bisphenol compound and a bisphenol diglycidyl ether-type epoxy resin to produce an epoxy-containing resin and introducing thereinto cationic groups and (B) a hydroxyl- and amino-containing acrylic resin, the resins (A) and (B) being crosslinked and cured by urethanation reaction with (C) an isocyanate crosslinking agent component.

The inventors of the present invention carried out extensive research to develop a cationic electrodeposition coating composition which is free of the above-mentioned drawbacks of the conventional electrodeposition coating composition. More specifically, they did research to develop a cationic electrodeposition coating composition which is lead-compound free but excellent in curability and in corrosion resistance of the cured coating film. The inventors of this invention finally found that this object can be achieved by adding to the above-mentioned component (A) a hydroxyl- and amino-containing acrylic resin (B). The invention has been accomplished based on this finding.

The component (A) of the composition of the invention is a resin prepared by introducing cationic groups into an epoxy-containing resin which is a reaction product of three components of an epoxy- or carboxyl-containing acrylic polymer (A-1), a bisphenol compound (A-2) and a bisphenol diglycidyl ether-type epoxy resin (A-3).

When an epoxy-containing acrylic polymer is used as the component (A-1), the component (A) has a graft structure in the molecule that the polymer (A-1) is linked to a bisphenol diglycidyl ether-type epoxy resin (A-3) via a bisphenol compound (A-2). When a carboxyl-containing acrylic polymer is used as the component (A-1), the component (A) has a graft structure in the molecule that the polymer (A-1) is linked to a bisphenol compound (A-2) via a bisphenol diglycidyl ether-type epoxy resin (A-3).

The component (A) before introduction of cationic groups contains epoxy groups, preferably epoxy groups and at least one hydroxyl group, in the molecule. For introduction of cationic groups, all or most of the epoxy groups are reacted with a cationizing agent, thus giving a cationized resin.

The epoxy- or carboxyl-containing acrylic polymer (A-1) is an acrylic polymer and contains at least one epoxy group or at least one carboxyl group in the molecule. The polymer (A-1) is prepared by polymerizing an epoxy- or carboxyl-containing polymerizable unsaturated compound alone or together with other polymerizable unsaturated compounds. It is essential that at least one of the polymerizable unsaturated compounds used be an acrylic compound. In view of facilitating crosslinking and curing reactions with an isocyanate crosslinking agent component, it is preferable that the polymer (A-1) have at least one primary hydroxyl group.

The epoxy-containing polymerizable unsaturated compound is a compound containing at least one epoxy group and at least one polymerizable unsaturated bond in the molecule. Examples thereof are glycidyl acrylate, glycidyl methacrylate and the like.

The carboxyl-containing polymerizable unsaturated compound is a compound containing at least one carboxyl group and at least one polymerizable unsaturated bond in the molecule. Examples thereof are monocarboxylic acids such as acrylic acid, methacrylic acid and the like; dicarboxylic acids such as maleic acid, itaconic acid, fumaric acid, mesaconic acid and the like; modified dicarboxylic acids such as anhydrides, half esters and the like of the above dicarboxylic acids; etc.

The term "other polymerizable unsaturated compounds" herein means compounds having at least one polymerizable unsaturated bond in the molecule, exclusive of the above-mentioned epoxy- or carboxyl-containing polymerizable unsaturated compounds. Examples of other polymerizable unsaturated compounds are hydroxyl-containing polymerizable unsaturated compounds having at least one hydroxyl group and at least one polymerizable unsaturated bond in the molecule, for example, monoesters of (meth)acrylic acid and $C_{2-20}$ glycol such as hydroxyethyl (meth)acrylate, hydroxypropyl (meth)acrylate, hydroxybutyl (meth)acrylate and the like, monoesters of (meth)acrylic acid and polycaprolactone (molecular weight 100–10,000, preferably 500–3,000) and the like; monoesters of (meth)acrylic acid and $C_{1-22}$ monovalent alcohol such as methyl (meth)acrylate, ethyl (meth)acrylate, propyl (meth)acrylate, butyl (meth)acrylate, hexyl (meth)acrylate, octyl (meth)acrylate, lauryl (meth)acrylate, 2-ethylhexyl (meth)acrylate and the like; $C_{2-18}$ alkoxyalkyl esters of (meth)acrylic acid such as methoxybutyl (meth)acrylate, methoxyethyl (meth)acrylate and the like; aminoacrylic compounds such as N,N-dimethylaminoethyl (meth)acrylate, N,N-diethylaminoethyl (meth)acrylate, N-t-butylaminoethyl (meth)acrylate, N,N-dimethylaminopropyl (meth)acrylate and the like; acrylamide compounds such as (meth)acrylamide, N-methyl (meth)acrylamide, N-ethyl (meth)acrylamide, N-butyl (meth)acrylamide, N-dimethyl (meth)acrylamide and the like; styrene, α-methylstyrene, vinyltoluene, (meth)acrylonitrile, vinyl acetate, vinyl chloride; etc.

Among these compounds it is particularly advantageous to use a monoester of (meth)acrylic acid and polycaprolactone which is a hydroxyl-containing unsaturated compound. Since the component (A-1) prepared using such a monoester has a relatively long distance from the backbone of the polymer to the hydroxyl group, the component (A-1) is highly compatible with components (A-2) and (A-3) and can uniformly react with these components and the reaction product obtained is highly reactive with an isocyanate crosslinking agent component.

The mixing ratio of the polymerizable unsaturated compounds for preparation of the acrylic polymer (A-1) can be suitably selected according to the purpose, but is preferably selected from the range that the polymer (A-1) has an epoxy equivalent of about 500 to about 5,000, particularly about 750 to about 3,000, an acid value of about 5 to about 120 mg KOH/g, particularly about 10 to about 80 mg KOH/g, a hydroxyl value of about 0 to about 350 mg KOH/g, particularly about 20 to about 300 mg KOH/g, and a number average molecular weight of about 300 to about 30,000, particularly about 3,000 to about 20,000.

Examples of the bisphenol compound (A-2) are bis(4-hydroxyphenyl)methane, bis(4-hydroxyphenyl)-1,1-ethane, bis(4-hydroxyphenyl)-2,2-propane, bis(4-hydroxyphenyl)-1,1-isobutane, 4,4'-dihydroxydiphenyl ether, 4,4'-dihydroxydiphenylsulfone, etc.

Typical examples of the bisphenol diglycidyl ether-type epoxy resin (A-3) are diglycidyl-etherified condensation products of the bisphenol compound (A-2) and epichlorohydrine. The epoxy resin (A-3) usually has a number average molecular weight of 375 to 5,000, preferably 800 to 3,000 and an epoxy equivalent of 180 to 2,500, preferably 400 to 1,500. Commercially available are "EPIKOTE 828" produced by Shell Chemicals, Co., Ltd. (bisphenol A type; number average molecular weight: 380), "EPIKOTE 1001" (bisphenol A type; number average molecular weight: 950), "EPIKOTE 1002" (bisphenol A type; number average molecular weight: 1,300) and so on.

For preparation of the component (A), the components (A-1), (A-2) and (A-3) are reacted, for example, by the following methods.

(1) Components (A-1) and (A-2) are reacted and then component (A-3) is reacted.

(2) Components (A-1) and (A-3) are reacted and then component (A-2) is reacted.

(3) Components (A-1), (A-2) and (A-3) are reacted simultaneously.

(4) Components (A-2) and (A-3) are reacted and then component (A-1) is reacted.

These reactions can quantitatively proceed by heating the components to about 100–250° C., preferably about 130–180°C. in the presence or absence of a catalyst. Examples of useful catalysts are tertiary amines, tertiary amino salts, quaternary ammonium salts, $BF_3$. amine complexes, trialkyl phosphates and like epoxy ring opening catalysts. Organic solvents can be used in these reactions. Examples thereof are alcohol solvents, ketone solvents, ether solvents, hydrocarbon solvents and the like.

The reaction product of the three components (A-1), (A-2) and (A-3), i.e., component (A) before introduction of cationic groups, is a resin having epoxy groups, preferably epoxy groups and at least one hydroxyl group, in the molecule. The reaction product has an epoxy equivalent of about 350 to about 5,000, preferably about 400 to about 3,000, a number average molecular weight of about 1,000 to about 10,000, preferably about 1,500 to about 6,000. The hydroxyl-containing reaction product preferably has a hydroxyl value of about 30 to about 150 mg KOH/g, particularly about 50 to about 100 mg KOH/g.

All or most of the epoxy groups in the above reaction product are reacted with a cationizing agent whereby cationic groups are introduced, thus providing a cationized resin, i.e., component (A).

Useful cationizing agents are, for example, amine compounds such as primary amines, secondary amines, tertiary amines, polyamine and the like. Such amine compounds are reacted with epoxy groups of the resin by conventional methods to introduce secondary amino groups, tertiary amino groups, quaternary ammonium salts or like cationic groups into the resin, thus providing cationized resin.

Examples of primary amines are methylamine, ethylamine, n-propylamine, isopropylamine, monoethanolamine, n-propanolamine, isopropanolamine and the like. Examples of secondary amines are diethylamine, diethanolamine, di-n-propanolamine, di-isopropanolamine, N-methylethanolamine, N-ethylethanolamine and the like. Examples of tertiary amines are triethylamine, triethanolamine, N,N-dimethylethanolamine, N-methyldiethanolamine, N,N-diethylethanolamine, N-ethyldiethanolamine and the like. Examples of polyamines are ethylenediamine, diethylenetriamine, hydroxyethylaminoethylamine, ethylaminoethylamine, methylaminopropylamine, dimethylaminoethylamine, dimethylaminopropylamine and the like.

Basic compounds other than the above-mentioned amine compounds are also useful as cationizing agents and include, for example, ammonia, hydroxyamine, hydrazine, hydroxyethylhydrazine, N-hydroxyethylimidazoline and the like. The basic groups formed using such a cationizing agent are protonized with acid to provide cationic groups. Useful acids are water-soluble organic carboxylic acids such as formic acid, acetic acid, glycolic acid, lactic acid and the like.

Alternatively, a salt of a sulfide (such as diethyl sulfide, diphenyl sulfide, tetramethylene sulfide, thiodiethanol or the like) and an acid (such as boric acid, carbonic acid, organic monocarboxylic acid or the like) can be reacted with an epoxy group to produce a tertiary sulfonium salt.

Also, a salt of a phosphine (such as triethylphosphine, phenyldimethylphosphine, diphenylmethylphosphine, triphenylphosphine or the like) and an acid (such as boric acid, carbonic acid, organic monocarboxylic acid or the like) can be reacted with an epoxy group to produce a quaternary sulfonium salt.

The component (B) of the composition of the present invention is an acrylic resin containing at least one hydroxyl group and at least one amino group.

The component (B) is prepared by polymerizing an acrylic polymerizable unsaturated compound, a hydroxyl-containing polymerizable unsaturated compound and an amino-containing polymerizable unsaturated compound as essential components to which other polymerizable unsaturated compounds can be added.

Examples of useful acrylic polymerizable unsaturated compounds are monoesters of (meth)acrylic acid and $C_{1-22}$ monovalent alcohol, $C_{2-18}$ alkoxyalkyl esters of (meth) acrylic acid and the like, as mentioned in the description of the polymer (A-1). The compounds can be used singly or as a mixture of two or more.

The hydroxyl-containing polymerizable unsaturated compound is a compound containing at least one hydroxyl group and at least one polymerizable unsaturated bond in the molecule. Examples thereof are primary hydroxyl-containing compounds, for example, monoesters of (meth) acrylic acid and $C_{2-20}$ glycol such as hydroxyethyl (meth)

acrylate, hydroxypropyl (meth)acrylate, hydroxybutyl (meth)acrylate and the like, monoesters of (meth)acrylic acid and polycaprolactone (molecular weight 100–10,000, preferably 500–3,000) and the like. These compounds can be used singly or as a mixture of two or more.

Examples of amino-containing polymerizable unsaturated compounds are aminoacrylic compounds such as N,N-dimethylaminoethyl (meth)acrylate, N,N-diethylaminoethyl (meth)acrylate, N-t-butylaminoethyl (meth)acrylate, N,N-dimethylaminopropyl (meth)acrylate and the like. These compounds can be used singly or as a mixture of two or more.

The term "other polymerizable unsaturated compounds" herein means compounds having at least one polymerizable unsaturated bond in the molecule, exclusive of the above-mentioned acrylic polymerizable unsaturated compounds, hydroxyl-containing polymerizable unsaturated compounds and amino-containing polymerizable unsaturated compounds. Specific examples are (meth)acrylamide monomers, styrene, α-methylstyrene, vinyltoluene, (meth)acrylonitrile, vinyl acetate, vinyl chloride and the like, these compounds being mentioned also in the description of the polymer (A-1).

The component (B) is generally prepared without using any epoxy-containing polymerizable unsaturated compounds or carboxyl-containing polymerizable unsaturated compounds. This does not mean that their use is forbidden.

The hydroxyl- and amino-containing acrylic resin (B) is prepared by polymerizing an acrylic polymerizable unsaturated compound, a hydroxyl-containing polymerizable unsaturated compound and an amino-containing polymerizable unsaturated compound as essential components to which other polymerizable unsaturated compounds can be added. The mixing ratio of these compounds can be suitably selected according to the purpose but is preferably selected from the range that the hydroxyl- and amino-containing acrylic resin (B) has a hydroxyl value of about 50 to about 400 mg KOH/g, preferably about 80 to about 300 mg KOH/g, an amine value of about 5 to about 100 mg KOH/g, preferably about 10 to about 65 mg KOH/g, and a number average molecular weight of about 2,000 to about 100,000, preferably about 3,000 to about 50,000.

The cationic electrodeposition coating composition of the invention comprises the components (A) and (B) as essential resin components. The proportions of the components (A) and (B) are that the component (A) is 15 to 99% by weight, more suitably 65 to 96% by weight, and the component (B) is 85 to 1% by weight, more suitably 35 to 4% by weight, based on the total solid amount of these two components.

In the composition of the present invention, an isocyanate crosslinking agent component (C) is added to crosslink and cure the components (A) and (B) by urethanation reaction.

A blocked polyisocyanate compound is used as the isocyanate crosslinking agent component (C), which can be added, for example, by the following methods:

(1) a completely blocked polyisocyanate compound is added to components (A) and (B);

(2) a partially blocked polyisocyanate compound is linked to part of the hydroxyl groups of component (A) and/or component (B) with a urethane bond in advance;

(3) a combination of the above two methods.

The blocked polyisocyanate compounds include completely blocked polyisocyanate compounds wherein all the isocyanate groups are blocked with a blocking agent, and partly blocked polyisocyanate compounds wherein part of the isocyanate groups are blocked with a blocking agent.

The polyisocyanate compound is a compound having at least two isocyanate groups in the molecule. Examples thereof are aliphatic diisocyanates such as hexamethylene diisocyanate, trimethylene diisocyanate, tetramethylene diisocyanate, dimeric acid diisocyanate, lysine diisocyanate and the like; alicyclic diisocyanates such as isophorone diisocyanate, methylenebis(cyclohexyl isocyanate), methylcyclohexane diisocyanate, cyclohexane diisocyanate, cyclopentane diisocyanate and the like; aromatic diisocyanates such as xylylene diisocyanate, tolylene diisocyanate, diphenylmethane diisocyanate, naphthalene diisocyanate, toluidine diisocyanate and the like; urethanated adducts, biuret type adducts, isocyanuric ring type adducts or like modified products of these polyisocyanates.

Blocking agents for blocking isocyanate groups of these compounds are, for example, phenol compounds, lactam compounds, active methylene compounds, alcohol compounds, mercaptan compounds, acid amide compounds, imide compounds, amine compounds, imidazole compounds, urea compounds, carbamic acid compounds, imine compounds, oxime compounds and the like.

According to the above method (1), a completely blocked polyisocyanate compound is added to the components (A) and (B). In the coating composition, the three components do not react with each other but are dissolved or dispersed separately. When the composition is made into a coating film and heated to the dissociation temperature or higher temperatures, the blocking agent is dissociated from the polyisocyante compound. Consequently free isocyanate groups regenerate and react with hydroxyl groups of the components (A) and (B), thus providing a three-dimensionally crosslinked and cured coating film. The completely blocked polyisocyanate compound is prepared by blocking all the free isocyanate groups of a polyisocyanate compound with a blocking agent. The completely blocked polyisocyanate compound is added preferably in such an amount that the isocyanate groups in the polyisocyanate compound are approximately equivalent to the total amount of hydroxyl groups of the components (A) and (B).

According to the method (2), the free isocyanate group of a partially blocked polyisocyanate compound is linked to part of the hydroxyl groups of component (A) and/or component (B) by a urethane bond to produce a self-crosslinking type resin. The partially blocked polyisocyanate compound is a polyisocyanate compound having in the molecule at least two isocyanate groups of which only one isocyanate group remains unblocked and all the other isocyanate groups are blocked with a blocking agent. The unblocked isocyanate group of the partially blocked polyisocyanate compound is urethanated with part of the hydroxyl groups of the components (A) and/or (B). Concerning the amount of the partially blocked polyisocyante compound, it is preferable that addition of the partially blocked polyisocyanate compound reduces the total number of free hydroxyl groups in the components (A) and (B) by approximately half. It is particularly preferable that the number of the free hydroxyl groups be approximately halved in each of the components (A) and (B).

The cationic electrodeposition coating is composition of the invention is usually prepared by the following steps. After addition of an isocyanate crosslinking agent component (C) to components (A) and (B) as described above, cationic groups of the component (A) are neutralized with an acidic compound (such as acetic acid, lactic acid or phosphoric acid) to disperse the mixture in water. For neutralization, an acid is preferably used in an amount of 0.1–0.7 equivalent, particularly 0.2 to 0.5 equivalent.

The cationic electrodeposition coating composition (water dispersion) thus obtained has a pH of 3 to 9, preferably 5 to 7. The resin concentration is suitably 5 to 30% by weight, based on solids.

When necessary, additives may be added to the cationic electrodeposition coating composition of the invention. Examples of the additives are anticorrosive curing catalysts such as hydroxides, oxides, organic acid salts or inorganic acid salts of a metal selected from aluminum, nickel, zinc, strontium, zirconium, molybdenum, tin, antimony, lanthanum, tungsten, bismuth or the like; a cationized epoxy-containing reaction product of a bisphenol compound (A-2) and a bisphenol diglycidyl ether-type epoxy resin (A-3); the above cationized epoxy-containing reaction product modified by reacting with at least one resin selected from polyester resins, polyether resins, polyurethane resins or polyamide resins; coloring pigments such as red iron oxide, titanium white, carbon black and the like; body pigments such as talc, mica and the like; antisetting agents; surfactants; and the like.

The cationic electrodeposition coating composition of the invention does not contain any lead compounds.

When the cationic electrodeposition coating composition of the invention is used to form a cationic electrodeposition coating, the electrodeposition is preferably carried out under the following conditions, using an article to be coated as a cathode and a carbon plate as an anode and stirring.

Bath temperature: 20–30° C.

Voltage: 100–400 V (preferably 200–300 V)

Current density: 0.01–3 A

Current passing time: 1–5 minutes

Electrode area ratio (A/C): 2/1–1/2

Interelectrode distance: 10–100 cm

The thickness of the electrocoating film is preferably about 10 to about 40 μm (when cured). The electrocoating film is crosslinked and cured by heating at about 120–180° C. for about 10–60 minutes. Examples of the article to be coated are conductive metallic substrates such as cold rolled steel plates, electrogalvanized steel plates, hot-dip zinc-coated steel plates, automotive bodies made of such metallic substrates, outer panels of electric appliances made of such metallic substrates, and the like.

The cationic electrodepositing coating composition of the invention is excellent in curability so that it can be fully cured at about 160° C. or lower temperatures. Also, the composition is excellent in corrosion resistance of the cured coating film. Moreover, because of no need to use lead compounds, the composition does not cause any environmental pollution.

BEST MODE FOR CARRYING OUT THE INVENTION

Production Examples, Examples and Comparative Examples are given below to illustrate the present invention in more detail, wherein "part(s)" and "%" are "wt. part(s)" and "wt. %" respectively, unless otherwise specified.

PRODUCTION EXAMPLE 1

Production of a Cationized Resin (Component (A))

(1) A flask equipped with a stirrer, thermometer, nitrogen inlet and reflux condenser was charged with 541 parts of butyl cellosolve and heated to 120° C. with stirring. While the temperature was maintained, a mixture of the following compounds was added dropwise over a period of 3 hours.

| | |
|---|---|
| Styrene | 510 parts |
| 2-Hydroxyethyl methacrylate | 340 parts |
| n-Butyl acrylate | 114 parts |
| "FM-3" (trade name, a product of Daicel Chemical Industries, a hydroxyl-containing polymerizable unsaturated compound prepared by addition of ε-caprolactone to 2-hydroxyethyl methacrylate) | 113 parts |
| Acrylic acid | 57 parts |
| Azoisobutyronitrile | 68 parts |

After completion of the dropwise addition, the resulting mixture was maintained at the same temperature for 1 hour. A mixed solution of 11.3 parts of azoisobutyronitrile and 85 parts of butyl cellosolve was added dropwise over a period of 1 hour. The mixture was maintained at the same temperature for 1 hour, thus giving a carboxyl- and hydroxyl-containing acrylic polymer (A-1) solution having a solids content of 63%.

The polymer obtained had an acid value of 40 mg KOH/g, a hydroxyl value of 140 mg KOH/g, and a number average molecular weight of 13,000.

(2) Into a flask equipped with a stirrer, thermometer, nitrogen inlet and reflux condenser, 1,000 parts of 4,4'-diphenylmethane diisocyanate was placed and dissolved at 50° C. At the same temperature, 750 parts of diethylene glycol monoethyl ether was added and the reaction was allowed to proceed until the isocyanate content of the solids became 5.76%, thus giving a partially blocked isocyante compound.

(3) A flask equipped with a stirrer, thermometer, nitrogen inlet and reflux condenser was charged with 272 parts of bisphenol A (A-2), 815 parts of a bisphenol A diglycidyl ether-type epoxy resin (A-3) having an epoxy equivalent of 185, and 0.25 part of tetraethylammonium bromide. The reaction was allowed to proceed at 150° C. until the epoxy equivalent of the reaction product became 570. After the reaction mixture was cooled to 120° C., 440 parts of the partially blocked isocyanate compound obtained in (2) was added and the reaction was allowed to proceed at 110° C. for 2 hours. Subsequently 200 parts of butyl cellosolve, 650 parts of the above acrylic polymer (A-1) solution having a solids content of 63% and 160 parts of diethanolamine were added. The reaction was allowed to proceed at 110° C. until no epoxy groups remained. The mixture was diluted with 375 parts of butyl cellosolve, giving a hydroxyl- and amino-containing acrylic resin [(A)-I] solution having a solids content of 72%.

The resin [(A)-I] before introduction of cationic groups had an epoxy equivalent of 700, a hydroxyl value of 80 mg KOH/g, and a number average molecular weight of 2,500.

PRODUCTION EXAMPLE 2

Production of an Acrylic Resin (Component (B))

After 223 parts of butyl cellosolve was heated to 130° C., a mixture of the following compounds was added dropwise over a period of 3 hours.

| | |
|---|---|
| Styrene | 400 parts |
| Methyl methacrylate | 72 parts |

-continued

| | |
|---|---|
| 2-Hydroxyethyl acrylate | 136 parts |
| 2-Hydroxyethyl methacrylate | 56 parts |
| "FM-3" | 56 parts |
| Dimethylaminoethyl methacrylate | 80 parts |
| Azoisobutyronitrile | 40 parts |

The reaction mixture was aged at the same temperature for 1 hour. Then a mixed solution of 8 parts of azobisdimethylvaleronitrile and 24 parts of methyl isobutyl ketone was added dropwise at the same temperature over a period of 1 hour. The reaction mixture was aged at the same temperature for 1 hour and diluted with butyl cellosolve, giving a hydroxyl- and amino-containing acrylic resin [(B)-I] solution having a solids content of 70 %.

The resin obtained had a number average molecular weight of about 17,000, a hydroxyl value of 120 mg KOH/g and an amine value of 36 mg KOH/g.

PRODUCTION EXAMPLE 3

Production of an Acrylic Resin (Component (B))

After 184 parts of butyl cellosolve was heated to 130° C., a mixture of the following compounds was added dropwise over a period of 3 hours.

| | |
|---|---|
| Styrene | 312 parts |
| 2-Hydroxyethyl methacrylate | 216 parts |
| "FM-3" | 192 parts |
| Dimethylaminoethyl methacylate | 80 parts |
| Azoisobutyronitrile | 40 parts |

The reaction mixture was aged at the same temperature for 1 hour. Then a mixed solution of 8 parts of azobisdimethylvaleronitrile and 56 parts of methyl isobutyl ketone was added dropwise at the same temperature over a period of 1 hour. The reaction mixture was aged at the same temperature for 1 hour and diluted with butyl cellosolve, giving a hydroxyl- and amino-containing acrylic resin [(B)-II] solution having a solids content of 70%.

The resin obtained had a number average molecular weight of about 15,000, a hydroxyl value of 145 mg KOH/g and an amine value of 36 mg KOH/g.

PRODUCTION EXAMPLE 4

Production of an Isocyanate Crosslinking Agent (Component (C))

After 268 parts of diethylene glycol monoethyl ether was added dropwise to 250 parts of 4,4'-diphenylmethane diisocyanate at 50° C., the reaction was allowed to proceed at 80° C. until no free isocyanate groups remained. A completely blocked polyisocyante compound is thereby obtained.

EXAMPLES 1–5 and COMPARATIVE EXAMPLES 1–2

Cationic electrodeposition coating compositions were prepared using the compounds obtained in Production Examples. More specifically, the compounds shown in Table 1 below were mixed in the amounts shown in the same table. The mixture was neutralized with 0.3 equivalent of acetic acid and diluted with water to provide a cationic electrodeposition coating composition having a solids content of 20%.

TABLE 1

| | Example | | | | | Comp. Ex. | |
|---|---|---|---|---|---|---|---|
| | 1 | 2 | 3 | 4 | 5 | 1 | 2 |
| (A)-I | 88 | 88 | 88 | 88 | 88 | 100 | 100 |
| (B)-I | 12 | | 12 | 12 | 12 | | |
| (B)-II | | 12 | | | | | |
| (C)-I | 7 | 7 | 7 | 7 | 7 | 7 | 7 |
| Dioctyl tin oxide | 3 | | 3 | 3 | 3 | 3 | 3 |
| Basic lead silicate | | | | | | 3 | |
| Cationized, modified resin | | | | | 100 | | |
| Zinc acetate | | | 2 | | | | |
| Bismuth hydroxide | | | | 2 | 2 | | |

In Table 1, the amounts are on solid basis. The cationized, modified resin was prepared by modifying an epoxy-containing reaction product of bisphenol A and a bisphenol A diglycidyl ether-type epoxy resin with a polyester resin and cationizing the modified product.

Using these cationic electrodeposition coating compositions, zinc phosphating cold rolled steel panels for automotive bodies were coated at a bath temperature of 28° C. to form electrodeposition coating films having a thickness of 20–25 μm when cured. The coating films were cured by heating at 160° C. for 10 minutes.

Using these coated panels, various performance tests were carried out according to the following methods.

Performance Test Methods

State of the coated surface:

(i) The coated panels were visually inspected for surface smoothness, etc. and evaluated according to the following criteria.

A: Good in surface smoothness, etc.

B: Unsatisfactory in surface smoothness, etc.

(ii) The surface roughness Ra (centerline mean roughness) of the coated panels was determined according to JIS-B-0601 to assess their surface smoothness. The cut-off value was 0.8 mm. Measurement was made using "Surfcom" (product of Tokyo Seimitsu Co., Ltd.).

Curability:

(i) The surface of the coated panels was forcibly rubbed reciprocatingly 20 times with four-ply gauze wet with methyl ethyl ketone over a stroke length of about 3–4 cm at a pressure of 4 kg/cm$^2$. The surface appearance was visually evaluated according to the following criteria.

A: No scratches were found on the coated surface.

B: Scratches were found but the substrate was not exposed yet.

C: The coating melted away and the substrate was exposed.

(ii) A test was carried out in the same manner as in (i) except using, as the solvent, methyl isobutyl ketone in place of methyl ethyl ketone.

(iii) The coated panels were immersed in a mixed solvent of ethanol and acetone (1:1 by weight) at 20° C. for 24 hours to extract the coatings. The weight ratio of the coating after extraction to the coating before extraction was determined. The results were shown as gel fraction ratio (%).

$$\text{Gel fraction ratio (\%)} = \frac{\text{weight of the coating after extraction}}{\text{weight of the coating before extraction}} \times 100$$

Corrosion resistance:

(i) The coated panels were crosswise cut with a knife to reach the substrates and a salt water spray test was carried out for 1,300 hours according to JIS-Z-2371. The width of rust and blister spots from the cut was measured. The coated panels were evaluated according to the following criteria.

A: Rust and blister spots less than 1 mm wide from the cut appeared.

B: Rust and blister spots less than 3 mm wide from the cut appeared and blisters on the plane surface were noticeable.

C: Rust and blister spots 3 mm or wider from the cut appeared and blisters were found over the whole surface.

(ii) The width (mm) of rust and blister spots from the cut was measured after a salt water spray test as mentioned in (i).

(iii) After 1,500 hours of salt water spraying as in (i), the width (mm) of rust and blister spots from the cut was measured.

Non-polluting property:

An evaluation was made according to the following criteria.

A: The coating is lead compound-free and excellent in non-polluting property.

B: The coating contains a lead compound and might cause environmental pollution.

Table 2 shows the results of the performance tests.

TABLE 2

|  | Example | | | | | Comp. Ex. | |
| --- | --- | --- | --- | --- | --- | --- | --- |
|  | 1 | 2 | 3 | 4 | 5 | 1 | 2 |
| State of the coated surface | | | | | | | |
| (i) | A | A | A | A | A | A | A |
| (ii) | 0.21 | 0.21 | 0.22 | 0.22 | 0.22 | 0.22 | 0.21 |
| Curability | | | | | | | |
| (i) | A | A | A | A | A | A | A |
| (ii) | A | A | A | A | A | A | B |
| (iii) | 96 | 96 | 97 | 97 | 97 | 96 | 88 |
| Corrosion resistance | | | | | | | |
| (i) | A | A | A | A | A | A | C |
| (ii) | 1.3 | 1.3 | 1.0 | 1.0 | 1.0 | 1.0 | 3.5 |
| (iii) | 2.5 | 2.5 | 2.0 | 2.0 | 1.0 | 2.0 | 8.0 |
| Non-polluting property | A | A | A | A | A | B | A |

We claim:

1. A cationic electrodeposition coating composition comprising a water dispersion of (A) a resin prepared by reacting an epoxy- or carboxyl-containing acrylic polymer, a bisphenol compound and a bisphenol diglycidyl ether epoxy resin to produce an epoxy-containing resin and introducing thereinto cationic groups and (B) a hydroxyl- and amino-containing acrylic resin, the resins (A) and (B) being crosslinked and cured by urethanation reaction with (C) an isocyanate crosslinking agent component.

2. A composition according to claim 1 wherein the isocyanate crosslinking agent component (C) is a completely blocked polyisocyanate compound.

3. A composition according to claim 1 wherein as the isocyanate crosslinking agent component (C), a partially blocked polyisocyanate compound is linked to part of the hydroxyl groups of any of component (A), component (B), or both component (A) and component (B) by a urethane bond.

4. A composition according to claim 1 which does not contain any lead compounds.

5. A composition according to claim 1 wherein the component (A) before introduction of cationic groups has epoxy groups and at least one hydroxyl group and has an epoxy equivalent of about 350 to about 5,000, a hydroxyl value of about 50 to about 150 mg KOH/g, and a number average molecular weight of about 1,000 to about 10,000.

6. A composition according to claim 1 wherein the component (B) has a hydroxyl value of about 50 to about 400 mg KOH/g, an amine value of about 10 to about 100 mg KOH/g, and a number average molecular weight of about 2,000 to about 100,000.

7. A composition according to claim 1 wherein the proportions of the components (A) and (B) are that the component (A) is 15 to 99% by weight and the component (B) is 85 to 1% by weight, based on the total solid amount of these two components.

8. A composition according to claim 1 which further comprises a curing catalyst.

9. A composition according to claim 1 which further comprises a cationized epoxy-containing reaction product of a bisphenol compound and a bisphenol diclycidyl ether epoxy resin.

10. A composition according to claim 1 which further comprises a cationized, modified, epoxy-containing reaction product of a bisphenol compound and a bisphenol diglycidyl ether epoxy resin, wherein said cationized, modified epoxy-containing reaction product is prepared by (i) modifying the epoxy-containing reaction product by reacting with at least one resin selected from the group consisting of polyester resins, polyether resins, polyurethane resins and polyamide resins and (ii) cationizing the modified product.

* * * * *